United States Patent [19]

Hovaguimian

[11] Patent Number: 4,915,019

[45] Date of Patent: Apr. 10, 1990

[54] MECHANISM FOR TRANSFORMING THE RECIPROCAL MOVEMENT OF A PISTON INTO A CIRCULAR MOVEMENT OF A SHAFT

[76] Inventor: Jacques Hovaguimian, 11 avenue Ollivary, F-13008 Marseille, France

[21] Appl. No.: 50,128

[22] PCT Filed: Aug. 8, 1986

[86] PCT No.: PCT/FR86/00283

§ 371 Date: Apr. 10, 1987

§ 102(e) Date: Apr. 10, 1987

[87] PCT Pub. No.: WO87/01167

PCT Pub. Date: Feb. 26, 1987

[30] Foreign Application Priority Data

Aug. 13, 1985 [FR] France ................. 85 12436

[51] Int. Cl.⁴ .............................................. F01B 9/00
[52] U.S. Cl. ......................................... 92/136; 74/435; 74/131; 74/50
[58] Field of Search ................. 92/136, 138; 74/89.17, 74/422, 435, 352, 358, 131, 50

[56] References Cited

U.S. PATENT DOCUMENTS

| 1,346,139 | 7/1920 | Smith | 74/131 |
| 2,513,514 | 7/1950 | Poage | 74/50 |

FOREIGN PATENT DOCUMENTS

| 516059 | 6/1953 | Belgium | 74/435 |
| 374054 | 4/1923 | Fed. Rep. of Germany . | |
| 2936004 | 4/1981 | Fed. Rep. of Germany | 74/435 |
| 612889 | 11/1926 | France . | |
| 0000068 | of 1904 | United Kingdom | 74/50 |
| 516436 | 1/1940 | United Kingdom | 74/50 |
| 540986 | 11/1941 | United Kingdom | 74/50 |

Primary Examiner—Robert E. Garrett
Assistant Examiner—Thomas Denion
Attorney, Agent, or Firm—William A. Drucker

[57] ABSTRACT

Device for transforming the alternating motion of a piston into a circular motion of a shaft with the possibility of predetermining the stop time of the piston at each of the two dead centers. It is comprised of an assembly of two pistons connected by two racks alternatingly in mesh with a toothed sector keyed on the shaft. On either side of said sector there is provided a cam of which the groove takes charge of the pistons, through rollers at the two dead centers.

4 Claims, 2 Drawing Sheets

MECHANISM FOR TRANSFORMING THE RECIPROCAL MOVEMENT OF A PISTON INTO A CIRCULAR MOVEMENT OF A SHAFT

BACKGROUND OF THE INVENTION

The invention relates to the transformation of a reciprocal movement obtained from a piston by the thrust of a fluid, into a rotary movement recoverable on a shaft or reciprocally.

Such transformation is traditionally obtained by a link-crank assembly with the drawbacks inherent in this system. In fact, the analysis of the force exerted on the link reveals a horizontal component, absorbing energy. In addition, for a constant rotational speed of the shaft, that of the piston follows a sinusoidal function, whence a reduced mean linear speed.

In use in thermal engines, the link-crank assembly makes it necessary to use different expedients such as ignition and exhaust advance, movement of the piston in accordance with a rigid mathematical law.

The present invention proposes overcoming these drawbacks and provides a device for transforming a reciprocal movement into a rotary movement which, while being of great mechanical simplicity, allows optimum efficiency to be obtained without requiring the use of ignition and exhaust advance of the thermal engines.

SUMMARY OF THE INVENTION

The device of the invention includes essentially two racks connected to the piston of the engine and which drive alternately a toothed sector carried by the drive shaft, two cams being also carried by the drive shaft and serving as guides for four rollers fixed to the mobile rack-piston assembly.

Advantageously, the second and last but one teeth of each of the racks are partially truncated, as well as the end teeth of this toothed sector cooperating with the racks.

The profile of the cam is designed so as to provide ignition only at the end of compression and so as to have a variation of the volume of the chamber, so of the pressure of the ideal mixture, during the whole combustion time.

Furthermore, a better exhaust and filling are obtained during the time when the piston is stopped at the end of its stroke, corresponding to a zone of the cam concentric with the axis of rotation of the output shaft.

BRIEF DESCRIPTION OF THE DRAWINGS

For a better understanding of the invention, one embodiment thereof will be described hereafter with reference to the accompanying schematic drawings in which.

DESCRIPTION OF THE PREFERRED EMBODIMENT

Figure 1:
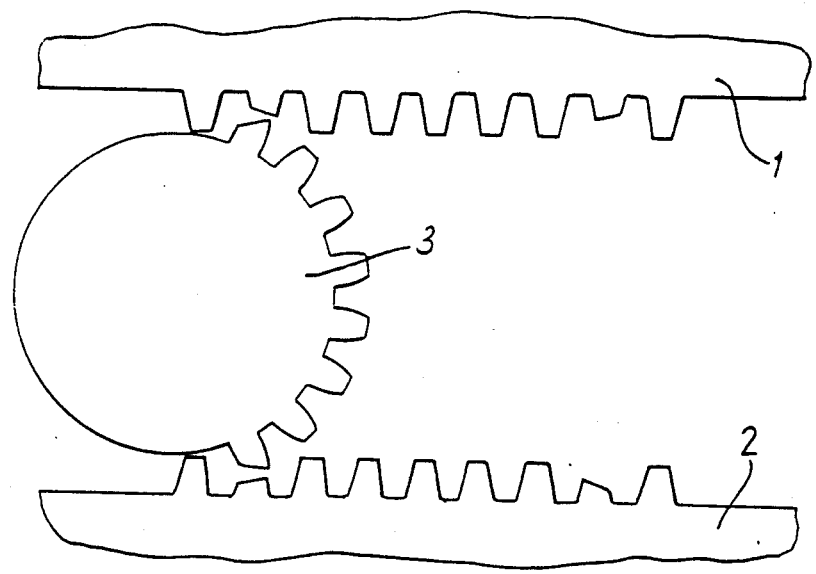
FIG. 1 shows a device having two racks cooperating with a toothed sector.

In FIG. 1 there is shown the device of the invention formed of two racks 1, 2 integrally secured to pistons (not shown in this Figure) and moving as a single block for meshing alternately with a toothed sector 3 fixed on the output shaft. In the example chosen, racks 1, 2 have 9 teeth and the toothed sector 3 integrally secured to the output shaft has 8 teeth, for a pinion of the same modulus having 20 teeth. The second and last but one teeth of each rack 1, 2 as well as the end teeth of the toothed sector 3 are truncated, as shown in FIG. 1. This Figure shows the toothed sector 3 in an intermediate position, separated from racks 1, 2.

Figure 2A:
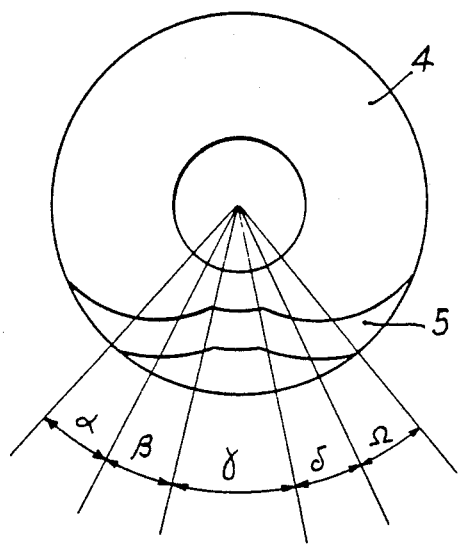
FIG. 2 shows a front and vertical sectional view of one of the cams fixed on the output shaft.
Figure 2B:
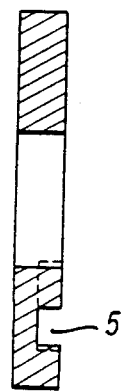

To provide drive continuity two cams 4, one of which is shown in FIG. 2, are fixed on the output shaft for taking over. A groove 5 formed in cam 4 guides a roller fixed to the piston-rack assembly. Groove 5 is broken down into five zones:

zone of angle $\alpha$, corresponding to the simultaneous drive of the ouput shaft by cam and rack at a distance V, zone of angle $\beta$, corresponding to a deceleration of the rack-piston assembly, zone of angle $\gamma$, stopping of this assembly, zone of angle $\delta$, acceleration of the assembly, zone of angle $\Omega$, simultaneous drive by cam and rack at speed -V.

During the end of travel strokes, the possibility of modifying the path of the groove of the cams allows the speed of movement of the mobile assembly, and so the variation of the volume of the combustion chamber to be controlled at will, depending on the fuel used.

During the rack drive the linear speed of the piston is constant and corresponds to the mean speed of link-crank drive systems. This linear speed may therefore be increased, while remaining below the jamming speed due to the friction of the segments on the cylinders, the rotational speed of the output shaft being increased in the same proportions.

Figure 3:
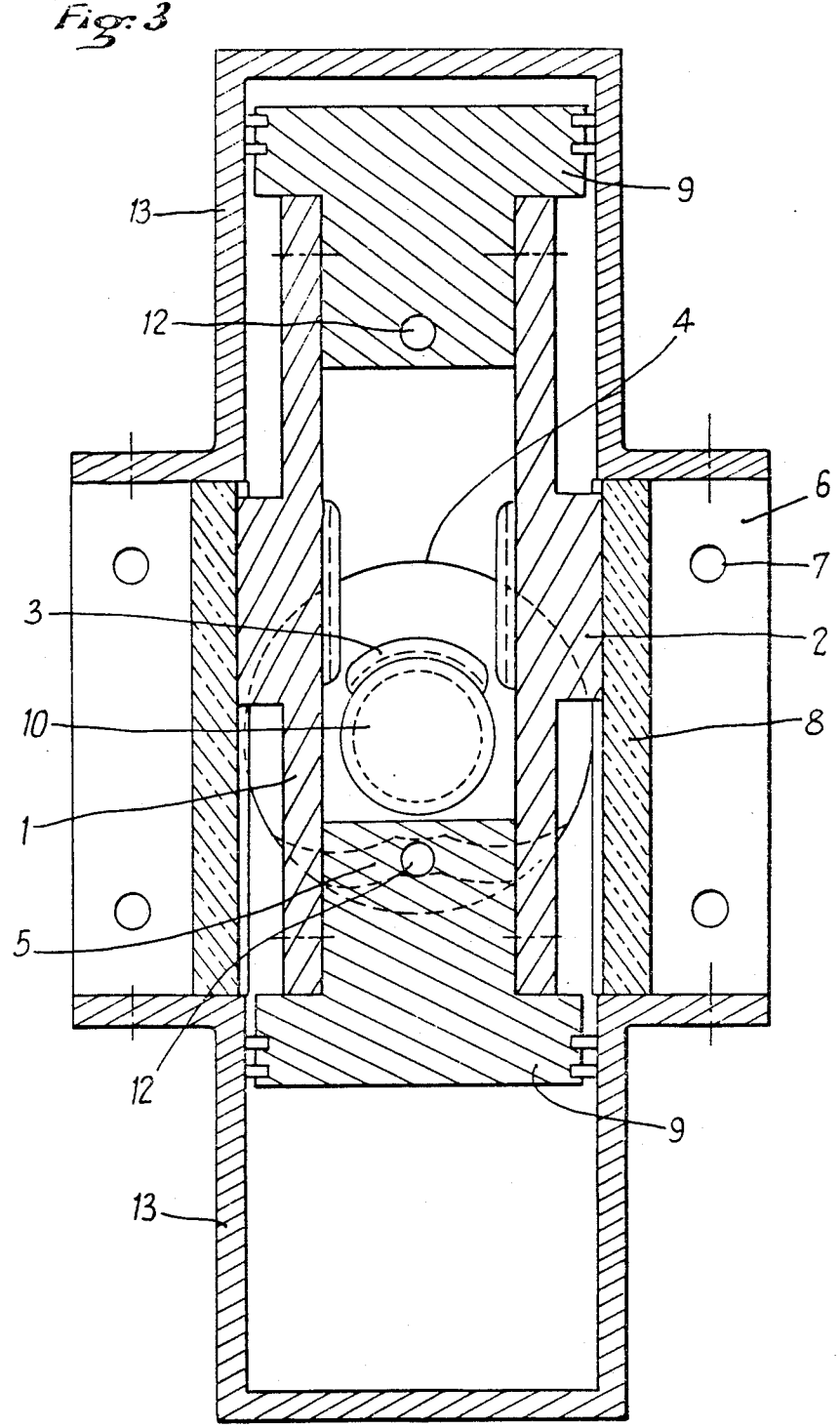
FIG. 3 shows one embodiment with two opposed pistons.

In FIG. 3 has been shown one embodiment with two opposed pistons. In this embodiment, two half bodies 6 are assembled together by four bolts 7 and sandwich therebetween two bronze slides 8 which guide the two racks 1, 2 joining the two pistons 9 together. On the output shaft 10 are assembled the toothed sector 3 and cams 4, the groove 5 of these cams driving the pistons 9 through rollers 12 carried thereby. The cylinders inside which pistons 9 slide are shown by the two caps 13 which cover the two half bodies.

The operation will be immediately understood from the prceding description, the movement in one direction of the assembly formed by pistons 9 and racks 2, following the explosion in one of the cylinders, causing one of the racks 2 to mesh with the toothed sector 3 and so rotating shaft 10. At the end of this meshing period, cam 4 cooperates with the roller 12 of one of the pistons so as to ensure continuity of the drive, then the explosion occurs in the other cylinder causing the movement of assembly 9, 2 in the opposite direction and so meshing of the other rack 1 with the sector 3 so as to continue the drive or shaft 10.

What is claimed is:

1. A device for transforming a reciprocal movement of a piston into a continuous rotary movement of a shaft, which comprises:

(a) a pair of pistons, each said piston providing a stroke in an opposite direction;

(b) two racks, each rack integral with and travelling uniformly in response to a stroke from both of pistons;

(c) said shaft;

(d) a circular grear having a toothed sector fixed to said shaft and disposed between said two racks, said toothed sector being in meshing engagement with one of said racks during a stroke from one of said pistons in one direction and in meshing engagement with the other of said racks during a piston stroke from the other of said pistons in the opposite direction;
(e) two rollers disposed and fixed on opposite faces of each of said pistons, on the longitudinal axis thereof; and
(f) two cams fixed on said shaft, each cam having a groove having five different zones co-acting with one of said rollers one said zone being concentric with the rotational axis of said shaft and corresponding to the termination of the stroke of one of said pistons, said cams guiding said rollers.

2. Device according to claim 1, wherein the second and last but one teeth of said racks are partially truncated.

3. Device according to claim 1, wherein the end teeth of the toothed sector are partially truncated.

4. Device according to claim 2, wherein the end teeth of the toothed sector are partially truncated.

* * * * *